United States Patent
Haisch et al.

(10) Patent No.: US 12,197,057 B2
(45) Date of Patent: Jan. 14, 2025

(54) INTEGRATED DISPLAY MODULE OR APPARATUS AND METHODS FOR OPERATING AND MANUFACTURING THE SAME

(71) Applicant: Snap Inc., Santa Monica, CA (US)

(72) Inventors: Mark E. Haisch, Vancouver, WA (US); Fernando Y. Chen, Gilbert, AZ (US); Rock Edward Kent, Estacada, OR (US); Howard V. Goetz, Tigard, OR (US); Patrick R. Thornton, Phoenix, AZ (US); Tyson Heskett, Scottsdale, AZ (US); Ian Kyles, West Linn, OR (US)

(73) Assignee: Snap Inc., Santa Monica, CA (US)

( * ) Notice: Subject to any disclaimer, the term of this patent is extended or adjusted under 35 U.S.C. 154(b) by 37 days.

(21) Appl. No.: 17/998,104

(22) PCT Filed: May 7, 2021

(86) PCT No.: PCT/US2021/031281
§ 371 (c)(1),
(2) Date: Nov. 7, 2022

(87) PCT Pub. No.: WO2021/226450
PCT Pub. Date: Nov. 11, 2021

(65) Prior Publication Data
US 2023/0176407 A1    Jun. 8, 2023

Related U.S. Application Data

(60) Provisional application No. 63/021,993, filed on May 8, 2020.

(51) Int. Cl.
*G02F 1/1333* (2006.01)
*G02F 1/1345* (2006.01)
*G02F 1/1362* (2006.01)

(52) U.S. Cl.
CPC .. *G02F 1/133308* (2013.01); *G02F 1/133305* (2013.01); *G02F 1/13452* (2013.01); *G02F 1/136277* (2013.01); *G02F 1/136286* (2013.01)

(58) Field of Classification Search
None
See application file for complete search history.

(56) References Cited

U.S. PATENT DOCUMENTS

2002/0001056 A1    1/2002  Sandberg et al.
2007/0132707 A1    6/2007  Choi et al.
(Continued)

FOREIGN PATENT DOCUMENTS

CN    115867855 A    3/2023
TW    200823524      6/2008
(Continued)

OTHER PUBLICATIONS

"International Application Serial No. PCT/US2021/031281, International Search Report mailed Aug. 31, 2021", 3 pgs.
(Continued)

*Primary Examiner* — Ashok Patel
(74) *Attorney, Agent, or Firm* — Schwegman Lundberg & Woessner, P.A.

(57) ABSTRACT

Systems, methods, apparatuses and devices provide an integrated display module or apparatus including a Liquid crystal assembly with highly integrated components including display driver circuitry and backplane circuitry. These approaches provide for packaging of displays with small form-factor displays and microdisplays and, in aspects, for usage in virtual and augmented reality devices.

20 Claims, 12 Drawing Sheets

(56) References Cited

U.S. PATENT DOCUMENTS

2016/0231604 A1    8/2016  Lin et al.
2019/0086720 A1*   3/2019  Yang ................. G02F 1/136209
2019/0187528 A1    6/2019  Bang et al.

FOREIGN PATENT DOCUMENTS

TW         202143210  A    11/2021
WO         WO-0229480 A2    4/2002
WO     WO-2021226450 A1    11/2021

OTHER PUBLICATIONS

"International Application Serial No. PCT/US2021/031281, Written Opinion mailed Aug. 31, 2021", 7 pgs.
"International Application Serial No. PCT/US2021/031281, International Preliminary Report on Patentability mailed Nov. 17, 2022", 8 pgs.
"Taiwanese Application Serial No. 110116628, Office Action mailed Nov. 5, 2024", w English translation, 16 pgs.

* cited by examiner

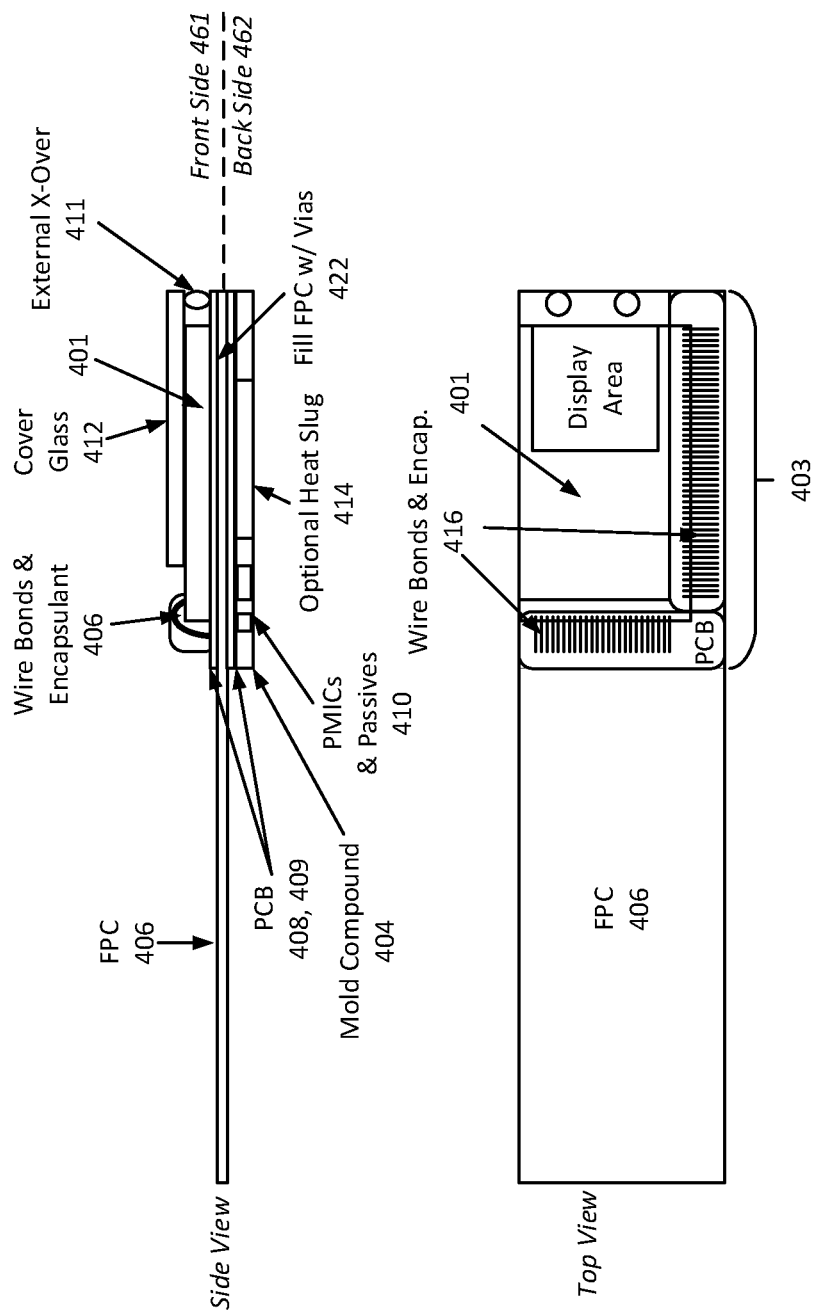

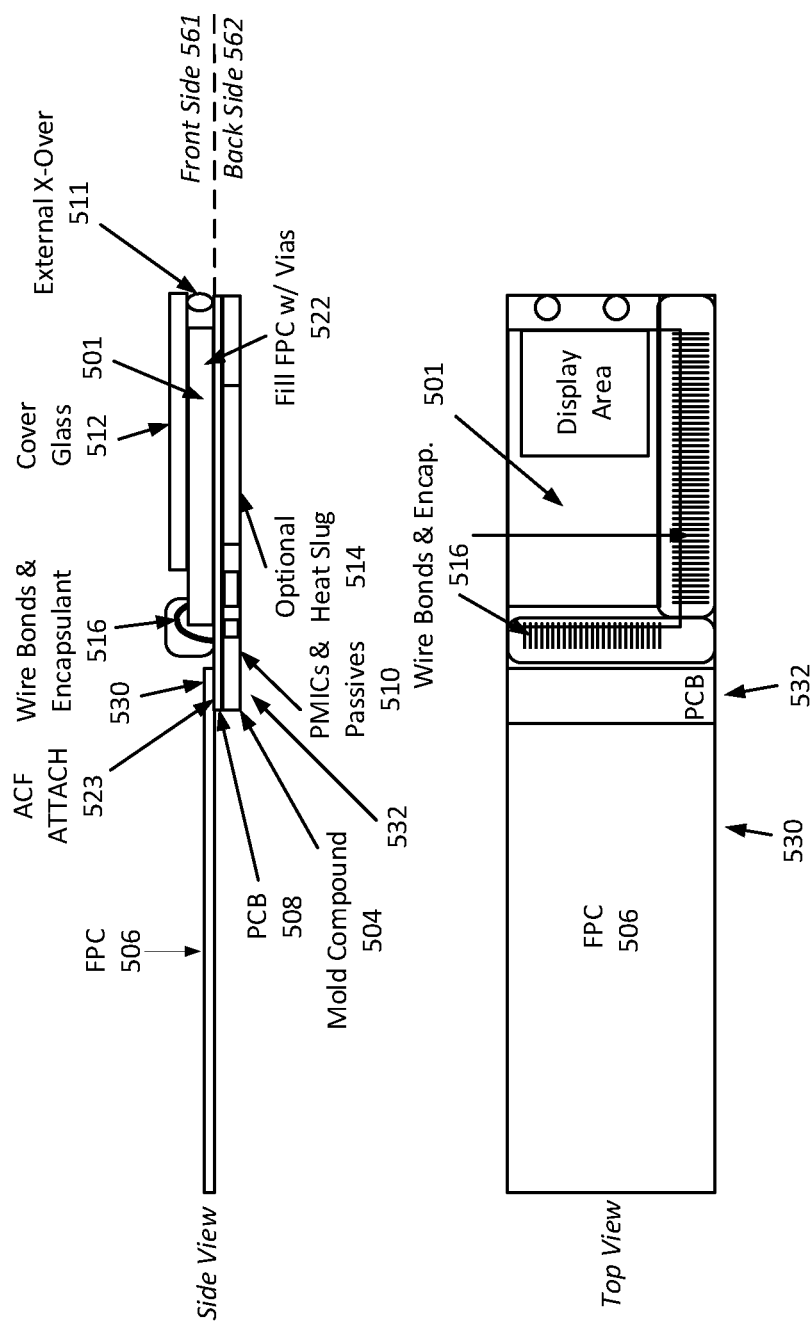

INTEGRATED DISPLAY MODULE OR APPARATUS AND METHODS FOR OPERATING AND MANUFACTURING THE SAME

CROSS-REFERENCE TO RELATED APPLICATION

This application is a U.S. National Stage Filing under 35 U.S.C. 371 from International Application No. PCT/US2021/031281, filed on May 7, 2021, and published as WO 2021/226450 on Nov. 11, 2021, which application claims the benefit of U.S. Provisional Application No. 63/021,993 filed May 8, 2020, which is incorporated herein by reference in its entirety.

TECHNICAL FIELD

The present disclosure relates to displays. More particularly, the disclosure relates to systems and methods of providing an integrated display module with highly integrated components for packaging of displays including small form-factor displays and microdisplays.

BACKGROUND

Displays and microdisplays are used in a number of different applications. These can include high-brightness projection systems, augmented reality (AR) or virtual reality (VR) headsets, automotive heads-up displays (HUD), and mobile applications. These different applications can place widely varying and size and weight constraints on a display device and related components. In mobile systems, including AR systems, VR systems, and Head-Mounted Displays, volume and weight are of paramount importance in making systems that can be worn comfortably for long periods. The available volume for electronic and optical components in these systems is limited. Further, the complexity of delivering high-quality power to the display integrated circuits (ICs) can limit performance.

BRIEF DESCRIPTION OF THE DRAWINGS

The present disclosure is illustrated and described herein with reference to the various drawings, in which like reference numbers are used to denote like system components, as appropriate, and in which:

FIG. 4A is a cross section of another embodiment of an IDM according to the present invention;

FIG. 4B is a top view of the IDM of FIG. 4A according to the present invention;

FIG. 5A is a cross section of another embodiment of an IDM according to the present invention;

FIG. 5B is a top view of the IDM of FIG. 5A according to the present invention;

Figure 1:
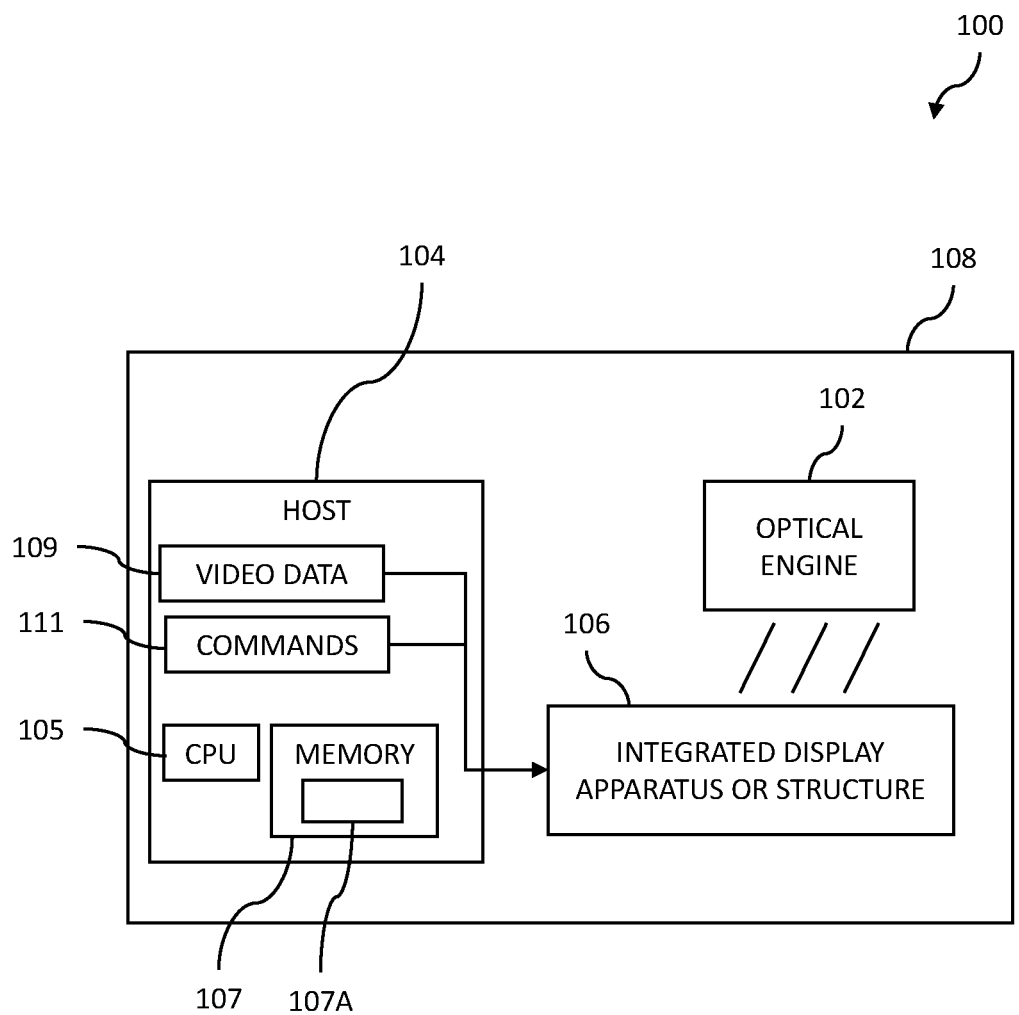
FIG. 1 is a block diagram of a system that uses an integrated display module or apparatus (IDM) according to various embodiments of the present invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Examples of the invention include systems, methods, apparatuses, and devices for providing integrated displays with highly integrated components for packaging of displays including small form-factor displays and microdisplays.

In the following detailed description, reference is made to the accompanying drawings which form a part hereof and in which are shown, by way of illustration, embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B," "A or B," or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The descriptions may use the terms "embodiment" or "embodiments," which may each refer to one or more of the same or different embodiments. Furthermore, the terms "comprising," "comprises," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting specific design details described below.

The approaches described herein provide devices, structures, and apparatuses that can be advantageously utilized in and accommodated by devices such as viewing or smart glasses or headsets. The devices, structures, and apparatuses are small enough to fit within the viewing glasses or headsets and are also lightweight thereby making them particularly suitable for usage in these or similar devices.

In addition, the viewing or smart glasses, headsets, or other devices sometimes have curved or non-linear dimensions and unique form factors. The present approaches provide IDMs that are structured so as to be used in devices with non-linear form factors or in devices where the IDM would need to bend. In these regards, the IDMs described herein are easily customizable and can be fitted into a wide variety of differently dimensioned devices.

As mentioned, these types of devices sometimes have portions that must bend or conform to movement or pressure. Consequently, portions of the IDM will need to bend. While needing to bend, portions of the IDM need to maintain a certain rigidity or stability, for example, to support integrated circuits that renders images to users. The IDMs provided herein provide both flexible and rigid portions, allowing the IDM to bend as portions of the device (in which the IDM is incorporated) bend while at the same time maintaining rigid portions, for instance, to support integrated circuits.

In an embodiment, a display apparatus for displaying images to users in a virtual or augmented reality system includes a flex printed circuit, at least one printed circuit board, and a liquid crystal assembly. The liquid crystal assembly includes a single silicon die (including one or more integrated circuits), a liquid crystal material, and a glass covering. The single silicon die includes display driver circuitry and backplane circuitry (e.g., backplane logic circuitry and/or control circuitry such as pixel control circuitry). The pixels are driven to display the data e.g., image data. Image data may be data related to still images or moving images (e.g., video data) and collectively render images to users in a display area.

The flex printed circuit includes a plurality of conductive wires. "Wires" include conductive elements for transmitting, data, for example, image data and control data. The wires provide electrical connections between a host device and the IDM. The data connections include video content and the control connections include commands from the host device and the IDM (and in some examples, from the IDM to the host device).

The at least one printed circuit board is coupled to the flex printed circuit. As mentioned and used herein, "coupled" may mean that two or more elements are in direct physical contact. However, "coupled" may also mean that two or more elements are not in direct contact with each other, but yet still cooperate or interact with each other.

In an embodiment of the present invention, the structure of the at least one printed circuit board is more rigid as compared to the flex printed circuit (e.g., a flex printed circuit cable or circuit integrated into is coupled to a flexible material). More specifically, the at least one printed circuit board has a rigidity that is greater than the rigidity of the flex printed circuit). As a result, the display apparatus is more rigid in areas where the printed circuit board is present. In general, areas of the display apparatus where the printed circuit board are disposed are more rigid than areas where the printed circuit board is not disposed.

The liquid crystal assembly also includes a display area (i.e., an area corresponding to an area where at least a portion of the liquid crystal material is present). The display area renders patterned light (e.g., images).

In an embodiment of the present invention, the liquid crystal assembly includes a silicon die, a liquid crystal layer (disposed between alignment and electrode layers), and a glass cover. These components are assembled together to form a single die, device or unit. The silicon die includes display driver circuitry and backplane circuitry. The display driver circuitry receives video data from an external source, parses the data, and forwards the data to the backplane circuitry. The backplane circuitry includes pixel drive circuitry and pixel logic that together form pixels. The pixels are driven to display the video data and collectively render images to users in a display area. The display area is defined in part by the liquid crystal layer and its width and length.

In an embodiment of the present invention, the display driver circuitry and the backplane circuitry are integrated into a single piece of silicon that is physically distinct and separate from other components of the display apparatus. The single piece of silicon is disposed on a first side of the display apparatus. In another embodiment, the display driver circuitry and the backplane circuitry are each formed as separate integrated circuits that are disposed on the first side of the apparatus.

A second side of the display apparatus is arranged and formed in parallel or substantially parallel relation to the first side. The second side is at least partially overmolded with a material to provide a flat or substantially flat surface. The flat surface facilitates attachment of the apparatus to other components or devices and handling and retention of the device during manufacturing steps.

In one embodiment, the at least one printed circuit board is a single printed circuit board that extends along and is disposed in parallel relation to the second side.

In an embodiment of the present invention, the at least one printed circuit board comprises a first printed circuit board and a second printed circuit board. In aspects, the first printed circuit board extends along the first side, and the second printed circuit board extend along the second side, and the flex printed circuit is disposed between the first printed circuit board and the second printed circuit board.

In an embodiment, the at least one printed circuit board comprises a single printed circuit board and a single integrated circuit is coupled directly to the single printed circuit board and not the flex printed circuit. For example, the single printed circuit board and the flex printed circuit may be attached at or about their ends.

In an embodiment, the display apparatus further includes a micro controller integrated circuit that is configured to manage operation of the display apparatus. In examples, the micro controller integrated circuit is configured to perform one or more functions including controlling an order of energizing power supply voltages of power supplies of the display apparatus, storing a control program, and reacting to events external to the display apparatus. Other examples of microcontroller functions are possible.

In an embodiment of the present invention, the conductive power wires that transmit power and voltage and the display apparatus further comprises a power management device that is coupled to the conductive power wires. The power management device is configured to convert external voltage sources received via the conductive power wires from an external power source or supply to internal voltages. In some aspects, the power management device is disposed on the second side of the apparatus.

In other examples, the display apparatus is disposed in viewing or smart glasses or at a headset. Other examples of devices where the apparatus is disposed are possible.

In an embodiment, a virtual or augmented reality display system includes an optical engine, a host, and an integrated display apparatus or module (IDM).

The optical engine is configured to produce, generate, direct, and/or control light presented to or exiting the integrated display apparatus. The host of a display system (e.g., a virtual or augmented display system) is configured to supply images or image data.

The IDM is coupled to the host. The IDM includes at least one printed circuit board, and a liquid crystal assembly and may or may not include a flex printed circuit. The liquid crystal assembly includes, for example, a single silicon die (or one or more integrated circuits), a liquid crystal material, and a glass covering. In an embodiment of the present invention, these components are assembled together and integrated in a single device, die, or unit. In an embodiment of the present invention single silicon device includes display driver circuitry and backplane circuitry (e.g., backplane logic and/or control circuitry).

The flex printed circuit includes a plurality of conductive elements, for example, wires. The conductive wires include data and control connections. The wires provide electrical connections between the host and the IDM. In an embodiment of the present invention, the flex printed circuit transmits bidirectional data between the host and/or the IDM. In an embodiment of the present invention, flex printed circuit transmits data (e.g., image and video data or content from a host and/or control data (e.g., commands) to the IDM. In an embodiment of the present invention, the flex printed circuit transmits data from the IDM (i.e., its internal components or circuitry) to the host device). In an embodiment of the present invention, the at least one printed circuit board is coupled to the flex printed circuit. The structure of the at least one printed circuit board is more rigid as compared to the flex printed circuit. For example, it is made from fiberglass and the flex circuit board is made from a flexible polymer.

In aspects, the display driver circuitry and the backplane circuitry are integrated into a single piece of silicon that is physically distinct and separate from other components of the apparatus. The single piece of silicon is disposed on a first side of the IDM. In another embodiment, the display driver circuitry and the backplane circuitry are each formed as separate integrated circuits that are disposed on the first side of the IDM.

A second side of the IDM is arranged and formed in parallel or substantially parallel relation to the first side. The second side is at least partially overmolded with a material to provide a flat or substantially flat surface. The flat surface facilitates attachment of the apparatus to other components or devices and handling and retention of the device during manufacturing steps.

In an embodiment, a method of manufacturing of a display system includes providing a flex printed circuit and at least one printed circuit board. The flex printed circuit is coupled to the at least one printed circuit board to form a structure, system, or apparatus.

Holes or vias are selectively drilled through the at least one printed circuit board and the flex printed circuit to provide vertical electrical connections between a silicon die coupled to the flex printed circuit and components attached to the printed circuit board and an improved thermal path for heat to escape from the die. The holes are plated or filled with a conductive material.

Various connections relate to the interconnection of these components based on their colocation or location with respect to the PCB, such that a small form factor is rendered. These connections include the flex printed circuit to the printed circuit board, the base of LCA being a silicon substrate with embedded pixel elements (reflective mirror elements made from for example aluminum), the reflective mirror elements are electrically coupled to the backplane circuitry (e.g., pixel circuitry) the silicon substrate (including backplane circuitry to the PCB, pixel circuitry in silicon with backplane circuitry, and the power circuitry electrically coupled to the die and components of the die.

A liquid crystal assembly is formed and includes a silicon die, a glass covering, and a liquid crystal layer. These components are integrated together to form a single device. The liquid crystal layer is disposed between a transparent electrode layer and an alignment layer. The liquid crystal assembly forms a display area about the liquid crystal layer.

The silicon die is formed to include display driver circuitry and backplane circuitry. The display driver circuitry is arranged to drive the backplane circuitry with data and commands and the backplane circuitry is arranged to drive the liquid crystal layer.

The liquid crystal assembly is coupled to a first side of the at least one printed circuit board. An electronic component (or components) is coupled to a second an opposing side of the at least one printed circuit board. The coupling is accomplished by using at least one of the holes.

In an embodiment of the present invention, the components of the liquid crystal assembly are assembled together to form a single, integrated device or circuit (for example, a single integrated circuit, individual circuit, circuit device, or chip. In an embodiment of the present invention, components, for example, the display driver circuitry and backplane circuitry may be included in separate integrated circuits (for example, individual circuits, circuit devices, integrated circuits, or chips).

In an embodiment of the present invention, cover glass coated with a transparent conductive material or at least partially transparent conductive material that is applied over the at least over an area of the LCA corresponding to where at least a portion of the liquid crystal material is present (this area may be referred to as a display area) of the liquid crystal assembly or single liquid crystal integrated circuit.

In an embodiment of the present invention, a second side of the structure is overmolded to encapsulate one or more of the components on the second side of the structure, (i.e., a side opposite of the liquid crystal assembly or integrated circuit and the overmold component or portion provides at least a partially flat or substantially flat surface for attachment to other components or devices (for example, and including but not limiting, power conversion circuitry) and handling and retention of the device, for example, during the manufacturing of the IDM. It would be understood by one of ordinary skill in the art that the IDM or display system may be included or coupled (for example, electrically and/or optically) in any system or to any device that renders modulated electromagnetic radiation (for example, light).

Referring now to FIG. 1, a display system (e.g., a virtual reality, augmented reality, mixed reality, or other display system 100 includes an optical engine 102, a host platform 104, a flexible circuit (for example, a flexible printed circuit), and an integrated display module or apparatus (IDM) 106. The system 100 may be disposed in a consumer device 108 such as viewing or smart glasses or a headset. Other examples of devices are possible. It will be appreciated that the components shown in FIG. 1 are not drawn or shown to scale. For example, the consumer device 108 may have various shapes or contours that are not shown in FIG. 1.

The optical engine 102 is configured to direct, guide, and/or control light presented to the integrated display apparatus 104. In examples, the optical engine 102 includes light creation elements such as LEDs or lasers, prisms, mirrors, polarizers, beam splitters and/or other optical components for the creation, direction, control, and/or presentation of light. The further structure of optical engines is known to those skilled in the art and will not be further discussed here. In one example, the optical engine 102 may be an Iris Engine device manufactured by Compound Photonics US Corp.

The host platform 104 includes a CPU or processing device 105 and a memory 107. As illustrated in FIG. 1, the host may transmit data 109 (e.g., images or image data, video or video data) or command 111 to the integrated display apparatus or model 106. The CPU 105, for example, an application processor, executes applications, or instructions 107a (e.g., software) stored in the memory device 107 of the host platform 104. The instructions 107a may perform functions such as sending the data, via a circuit (e.g., a flex circuit), to the IDM 106, or combining the video data 109 and commands 111 then sending the combined data and commands to the IDM 106.

In an embodiment of the invention, the host platform 104 is disposed within the device 108.

In another embodiment of the present invention, the host platform 104 may be disposed outside the device 108 and may be, for example, a mobile device, such as smartphone, tablet, laptop, head-up display system, head mounted device, or hybrid device (or some combination of the aforementioned).

In an embodiment of the present invention, the image, image data, and/or video data 109 is received by the real time data software module 107a and the real time data software or software module 107a combines the data with the commands parsed from a master sequence file containing a desired drive sequence In an embodiment of the present invention, the data combined with the commands is combined data that is output from the data source (e.g., the host platform) 104 and transmitted to the IDM 106. The integrated display module or apparatus (IDM) 106 is coupled to the optical engine and the at least one processing device. In an embodiment of the present invention, the IDM 106 is electrically coupled to a flex printed circuit, and the IDM includes at least one printed circuit board and a liquid crystal assembly. These components are described and shown in greater detail elsewhere in this description.

In one example of the operation of the system of FIG. 1, images from the host platform 104 are received by the display driver device of the IDM 106 via the flex circuit 202 and displayed on the display area using in part the light created by, received from, and/or directed by the optical engine 102. A human user views the images at the display of the IDM 106 through or using the optical engine 102. In an embodiment of the present invention, the liquid crystal assembly outputs modulated electromagnetic radiation, for example, light.

Figure 2A:
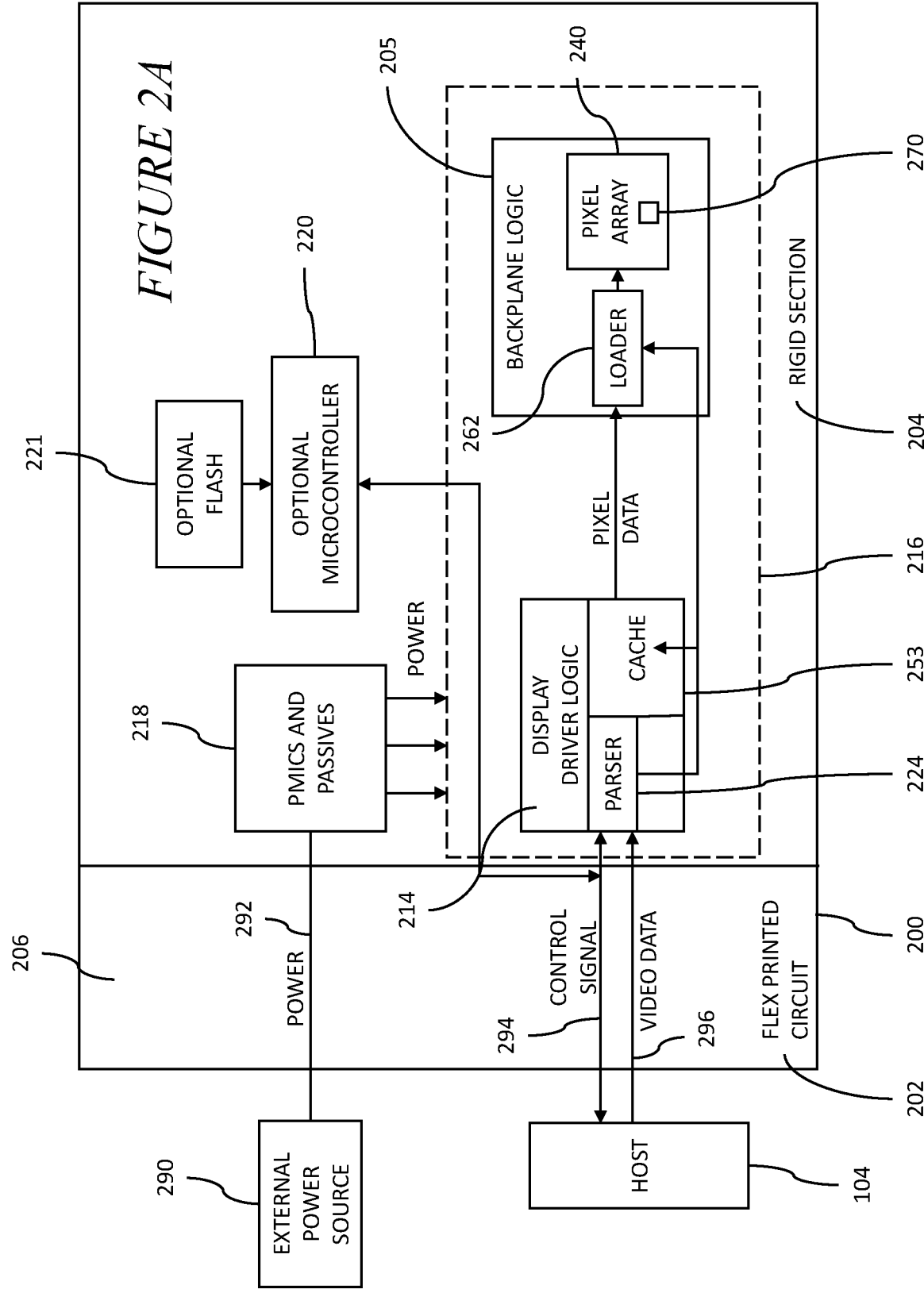
FIG. 2A is a block diagram of an IDM according to an embodiment of the present invention.
Figure 2B:
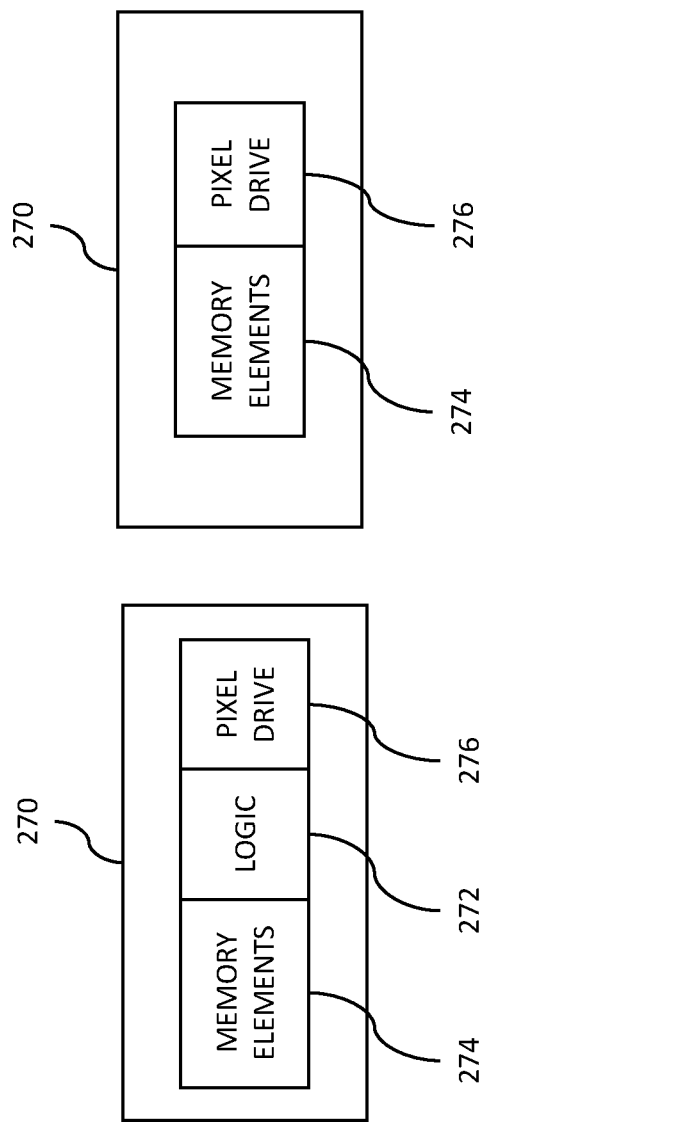
FIG. 2B is a block diagram of a portion of the IDM depicted in FIG. 2A according to an embodiment of the invention.

Turning now to FIG. 2A and FIG. 2B, a block diagram showing connections and components of an embodiment of an integrated display module or apparatus (IDM) 200 according to the present invention are illustrated. The IDM 200 includes at least one PCB (not shown in these figures) and is coupled to a flex circuit or flex printed circuit (FPC) 202. The PCB is arranged to cause the IDM 200 to have a rigid section 204, and the IDM is electrically coupled to is a less rigid section or interface 206. In an embodiment of the present invention the IDM may include or be integrated with the less rigid section, for example the flex circuit or flex printed circuit (FPC) 202.

The interface 206 includes Power Connectors 292, Video Data Connectors 296 (e.g., MIPI DSI bus) and Control Signal Connectors 294 (e.g., for transmitting USB or SPI or I2C bus and interrupt signals). In an embodiment of the present invention, the interface is a section of the IDM 200 that provides electrical connections from a host platform 104 (as described above with respect to FIG. 1) via a flex circuit or flex printed circuit (FPC) 202. In an embodiment the interface 206 may be electrically coupled to an external power source 290. In an embodiment, the power source may be internal to the IDM 200. These connectors 292, 294, and 296 may be formed with any appropriate conductive material such as a metal. The power connectors 292 are utilized to provide power from an external power source 290 (e.g., a battery) to components of the IDM 200. The Control Connectors 294 and Data Connectors 296 are utilized to supply commands and video data from the host 104 to the IDM 200. The FPC 202 is constructed of material so as to be pliable or bendable thereby being able to be fitted into a variety of different devices with different form factors. The dimensions of the FPC 202 can be adjustable depending, for instance, on the requirements of the device in which the FPC 202 is fitted. For example, the length of the FPC may be adjusted to suit various requirements.

A liquid crystal assembly (LCA) 216 is formed from a silicon die (not shown), a liquid crystal layer (disposed between alignment and electrode layers and not shown), and a glass cover (not shown). The silicon die, liquid crystal layer (and other layers), and glass are discussed and illustrated elsewhere herein. These components are integrated together to form a single device or unit 216.

The silicon die 302 includes display driver circuitry 214 and backplane circuitry 205. The display driver circuitry 214 receives video data from the host 104, parses the data, and forwards the data to the backplane circuitry 205. The backplane circuitry 205 includes pixel drive circuitry 276 and pixel logic 270 that together form pixels 270. The pixels 270 are driven by the combined actions of the display driver circuitry 214 and backplane circuitry 205 to display the video data and collectively render images to users in a display area of the LCA 216. The display area is defined in part by the liquid crystal layer and its width and length.

The display driver circuitry or logic 214 includes a parser 224 and a cache 253. The backplane circuitry or logic 205 includes a loader 262 and a pixel array 240 (with pixels 270).

In an embodiment of the present invention, the data and commands are combined over a single line 294 and 296 and the display driver circuitry 214 receives the combined data from the host, and converts the combined data into Serial Peripheral Interface (SPI) commands and bit plane data. In an embodiment of the present invention, the parser 224 receives the combined data, parses and/or separates the combined data into command and image data. The data and commands may be stored at least temporarily in the cache 253. The loader and SPI slave 262 receives the SPI commands and converts them to parallel data and a write strobe and then sends or outputs the data and strobe to registers of the backplane circuitry. The pixel circuits 170 receives the bit plane data (e.g., instantaneous brightness or intensity values for each pixel of the display and modulates its output, controlling the intensity of the pixel. A pixel corresponds to a pixel electrode on one side of a liquid crystal material and an electrode on the other side of the other side of the liquid crystal material. In an embodiment of the present invention, the pixel electrodes are individual electrodes, and the electrode on the other side is a common electrode that is common to more than one pixel. In an embodiment of the invention, the pixel electrodes are reflective elements. In an embodiment, they are metallic elements. In an embodiment, the pixel electrodes are reflective mirror element. In an embodiment, the pixel electrodes are made from aluminum. In an embodiment the common electrode is made from a conductive material. In an embodiment, the common electrode is made from indium tin oxide.

In an embodiment of the present invention the SPI commands are commands that write to internal registers or memories. In an embodiment of the present invention the bit plane data is data that determines or controls the intensity or brightness of a pixel, when presented to the pixel array sequentially and may be arranged in words representing data to be distributed to a series of pixels in rows or columns or rectangular sub-areas of the pixel array 240.

In an embodiment of the present invention, each pixel circuit 270 includes pixel logic circuitry 272 connected to at least one transistor 274 and a pixel electrode 276. In an embodiment of the present invention, the pixel logic 272 includes logic elements e.g., one or more logic gates or combinatorial logic circuits) that generate a digital output or value (e.g., an on or off value, or one or zero value) that is output to one end of the transistor to which it is coupled. In an embodiment of the present invention, the transistor is a field effect transistor (FET). In an embodiment of the present invention, the transistor is electrically coupled to a voltage source or a DAC (e.g., a Bias DAC). In an embodiment of the present invention, the other end of the transistor is electrically coupled to a pixel electrode 276 or pixel element.

In an embodiment of the present invention, the pixel electrode is electrically coupled to the pixel element, for example, an LED, or microLED. A reference to an LED for purposes of this disclosure is also a reference to a microLED.

In an embodiment of the present invention, the LCA 216 is a single integrated unit that integrates the display driver circuitry 214 and backplane circuitry 205 as well as pixel circuits. The integration may be accomplished by any appropriate fabrication process. The single integrated device or circuit 216 has electrical components that are formed, attached, or are associated to or with a silicon substrate or single die. The single integrated device 216 is physically separate and distinct from other components of the IDM 200 such as the PMICs and passives 218. In examples, the single integrated circuit 216 includes many (e.g., millions) of transistors, resistors, capacitors, or other electrical or electronic elements that are configured, arranged, and connected to implement the functions of the display driver circuitry 214, backplane circuitry 205, and pixel circuits 270 all in silicon material, substrate, or die, for example, a monolithic piece of silicon. As mentioned, in an embodiment of the present invention, the single integrated circuit 216 has a display area 393 corresponding to the at least a portion of the pixel array that emits light or corresponding to at least a portion of the area that holds the liquid crystal material. Modulated light, patterned light, or images, are output from the liquid crystal assembly in the display area. In an embodiment of the present invention, the pixels 270 of the display, generates an image from a top surface of the single integrated circuit or output an image in the display area. In one example, the dimensions of the single integrated circuit are 4×3 mm. Other examples of dimensions are possible.

In other examples, the IDM 200 includes power management circuitry 218 (for example, one or more Power Management Integrated Circuits (PMICs)). The PMICs convert input voltages from, for example, an external battery 290 to one or more internal voltages, for example, internal voltages for components of the display driver circuitry 214 and backplane logic 205. A PMIC includes associated passive components such as capacitors, inductors and resistors used for programming and filtering those voltages. Other functions and components are possible.

In an embodiment of the present invention, control circuitry or a micro-controller integrated circuit 220 may be included in the IDM. In an example, the micro-controller IC, and is used to manage operation or aspects of the operation of the Integrated Display Module (IDM) 200 and/or flex circuit 202. Such functions and operation by the control circuitry or a micro controller integrated circuit 220 may include sequencing (i.e., controlling the order of energizing) of power supply voltages, translation of control signals or voltage control inputs/outputs generated by a host, storing and executing a control program. In an embodiment of the present invention, the control program loads settings of one or both of the DDIC and DBIC and reacts to various events (e.g., temperature changes, changes in lighting conditions, etc.). In other examples, the micro-controller integrated circuit 220 may form warning, informative, for example, about the temperature of the IDM 200, or other types of messages that software on the host or in an embedded microcontroller will react to, and for instance shut down the display, or change operating parameters to adjust display performance to the new conditions The IDM 200 also may include an optional flash memory 221, which stores a control program executed by the micro-controller 220. As mentioned, the control program may perform various functions.

In an embodiment, the IDM 200 may additionally include a sensor, such as a temperature sensor, that is coupled to the microcontroller 220. In another embodiment, the microcontroller 220 may receive information or instructions from the host 104 via the data and/or control lines 294, 296.

Figure 3A:
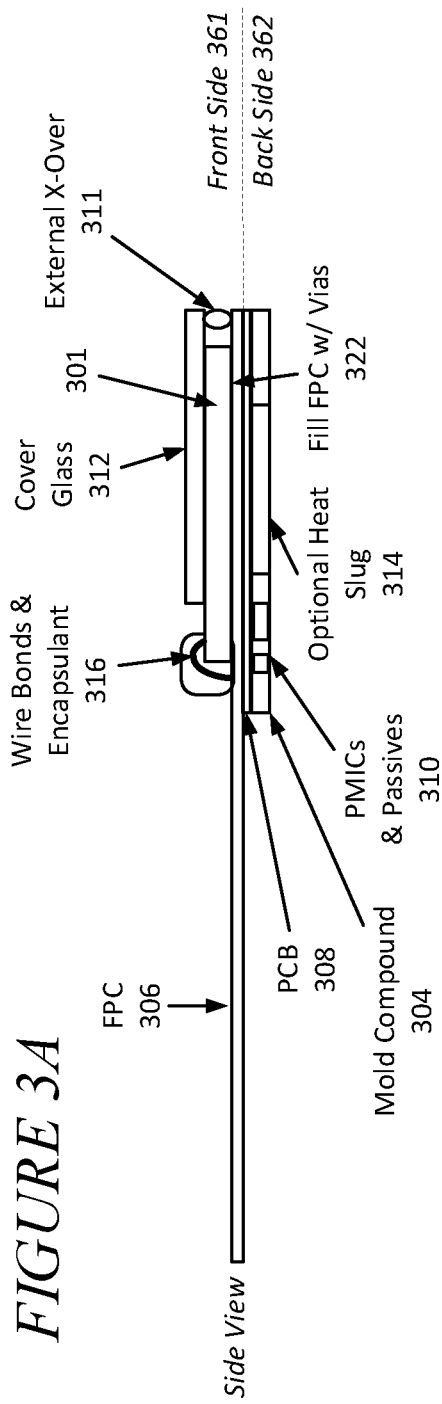
FIG. 3A is a cross section of an embodiment of an IDM according to the present invention.
Figure 3B:
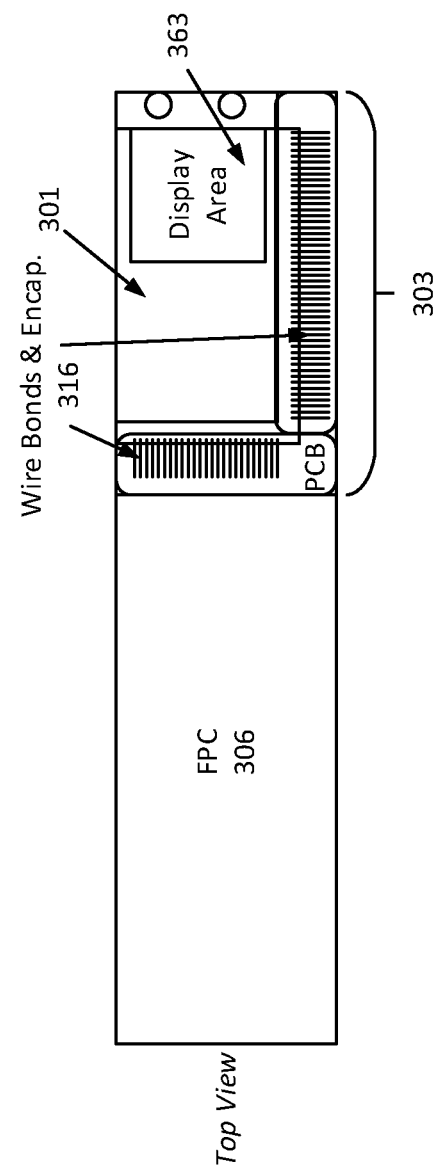
FIG. 3B is a top view of the IDM of FIG. 3A according to the present invention.
Figure 3C:
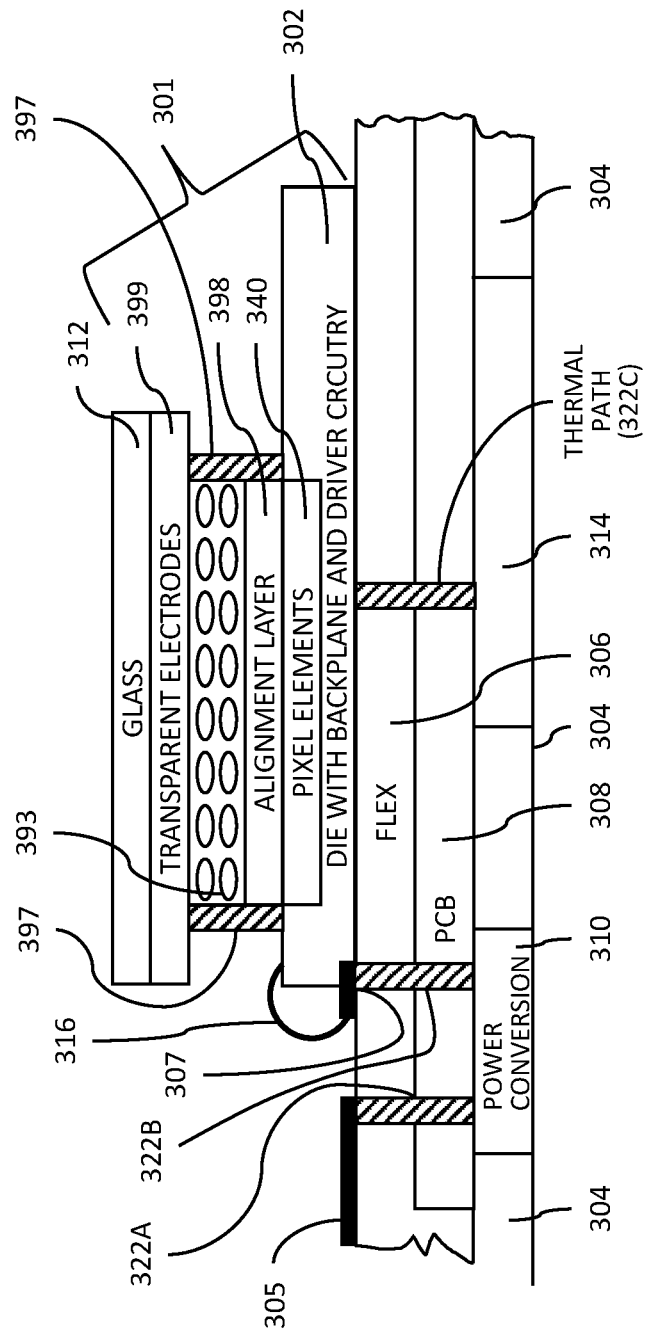
FIG. 3C is a cross section of a portion of the IDM of FIGS. 3A and 3B according to the present invention.

Turning to FIGS. 3A, FIG. 3B, and FIG. 3C (collectively FIG. 3) a cross-sectional/side and top views of an embodiment of an IDM 300 in accordance with the invention are shown. The illustrations depict placement of some of the physical components that may be in aspects of the invention. It will be appreciated that the IDM 300 shown in FIG. 3 (or the IDMs shown in FIG. 4 and FIG. 5) is not necessarily drawn to scale. Various dimensions are possible and may depend, in part, upon requirements of the device in which the IDM 300 is used. In one embodiment the IDM does not include the flex printed circuit, while in other embodiments it does include the flex printed circuit.

The IDM of FIG. 3 includes a single die 302 (including Display Driver circuitry, Backplane circuitry,). The die 302 is integrated with pixel elements 340, and alignment layer 398, liquid crystal layer 393, transparent electrodes 398, and glass 312 to form an LCA 301 (e.g., LCA 216 of FIG. 2A). The LCA 301 is mounted on one side of a FPC 306 In other aspects, these components are mounted or coupled to the rigid portion 303 of the FPC 306, for instance by soldering or other suitable means of electrical coupling. The functions of these components are described above with respect to FIG. 2 and will not be repeated here.

In examples, the rigid portion 303 of the FPC 306 referred to herein is the portion of the FPC 306 that is lying adjacent to, reinforced by, and/or augmented with PCB 308. The PCB 308 is constructed of material, such as BT epoxy Power management circuitry 310, which may include PMICs and/or passive components, for example, resistors, capacitors, inductors and crystals, are mounted on the opposite side of the FPC 306. This configuration enables efficient use of the surface area, while reducing and optimizing the width and length required for the dimensions of the rigid portion. The dimensions depend on the desired size of the display area of the LCA or the display driver circuitry to mention two examples.

The back side of the FPC 306 is over-molded with a material 304, for example, a mold compound (which, in an example, is a composite material consisting of, for example, epoxy resins, phenolic hardeners, silicas, catalysts, pigments, and/or mold release agents) that protects the back side components mechanically and/or electrically. The mold compound also provides a flat surface for mounting one or more other components, for example, heat removal means, such as a heat sink, Pyrolitic Graphite sheeting and/or thermo-electric cooler to conduct heat away from a heat source (e.g., LCA 301, and PMICs 310) inside the IDM 300.

The LCA 301 consists of a silicon die with a display area 393, perimeter seal (not shown), Cover glass 312, and Liquid Crystal layer 393. In an example, the LCA 301 is mounted and then wire-bonded 316 to the underlying FPC 306. Alternatively, the LCA may be mounted to and wire-bonded to another rigid PCB portion 303 as provided in FIG. 3, in order to have the display area (illustrated in the top view of FIG. 3) visible. In aspects, the bond wires 316 are encapsulated to prevent or protect them from damage and corrosion. In aspects, a heat slug 314 may be inserted that conducts heat from the die 302 to the overmold 304 (i.e., mold compound on the back of the FPC 306 that encapsulates the components on that side). A cross-over connection 311 (labeled "external X-over") from the back of the cover glass 312 to the FPC 306 or alternatively the PCB 308 is provided to control a voltage on the cover glass 312 via the cross-over connection 311. Vias 322 are drilled or punched through the PCB 308 and FPC 306 for vertical electrical connections between components and also to provide thermal relief for components such as the die 302.

In an embodiment, power is received over a wire 305, is transmitted over a via 322 to power conversion circuitry 310, is converted to a lower or higher voltage by the power conversion circuitry 310. The lower power is transmitted through another via 322B, to a wire 307, which transmits the power to wires 316. The wires 316 couple to the die 302. The lower voltage can then be applied to components within the die 302.

The LCA 301 may be formed of the die 302, pixel elements 340, alignment layer 398, liquid crystal layer 3903, transparent electrodes 399, and glass 312. The pixel elements 340 may include reflective devices or layers, which may be aluminum layers have pixel array(s) pixel arrays 240) arranged thereon, coupled or integrated with the die 302. A liquid crystal layer 393, alignment layer 398, transparent electrodes (typically within an Indium Tin Oxide layer) 399 and a glass or other transparent material layer 312 also form the structure.

Figure 4C:
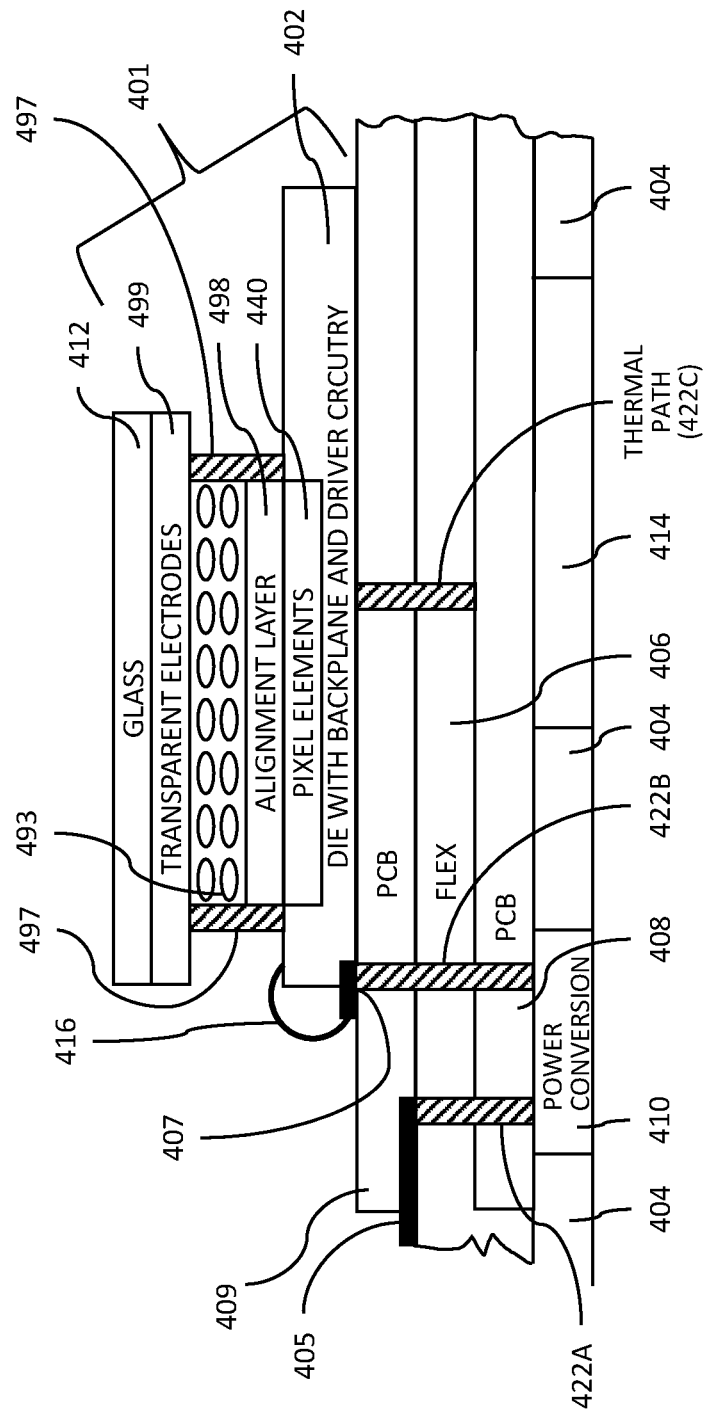
FIG. 4C is a cross section of a portion of the IDM of FIGS. 4A and 4B according to the present invention.

Turning to FIGS. 4A, 4B, and 4C (collectively FIG. 4) another example of an IDM 400 is described including a cross-sectional/side and top view of the IDM 400. Like-numbered components in FIG. 4 correspond to like-numbered components in FIG. 3 (e.g., element 404 in FIG. 4 corresponds to element 304 in FIG. 3); the functions, operation, and structure of like-numbered components are the same or similar and will not be repeated again here.

In this embodiment, the FPC 406 includes a rigid section 403. Here, the rigid section of the FPC 406 is the portion of the FPC 406 that is sandwiched between two PCBs 408 and 409. The first PCB 408 is on a front side of the IDM 400, and the second PCB 409 on a back side of the IDM 400. In aspects, the LCA is mounted to and wire-bonded to another rigid PCB portion, as noted above. This embodiment provides added rigidity for the rigid section 403 providing additional stability in situations where additional stability is required for components of the IDM 400.

Figure 5C:
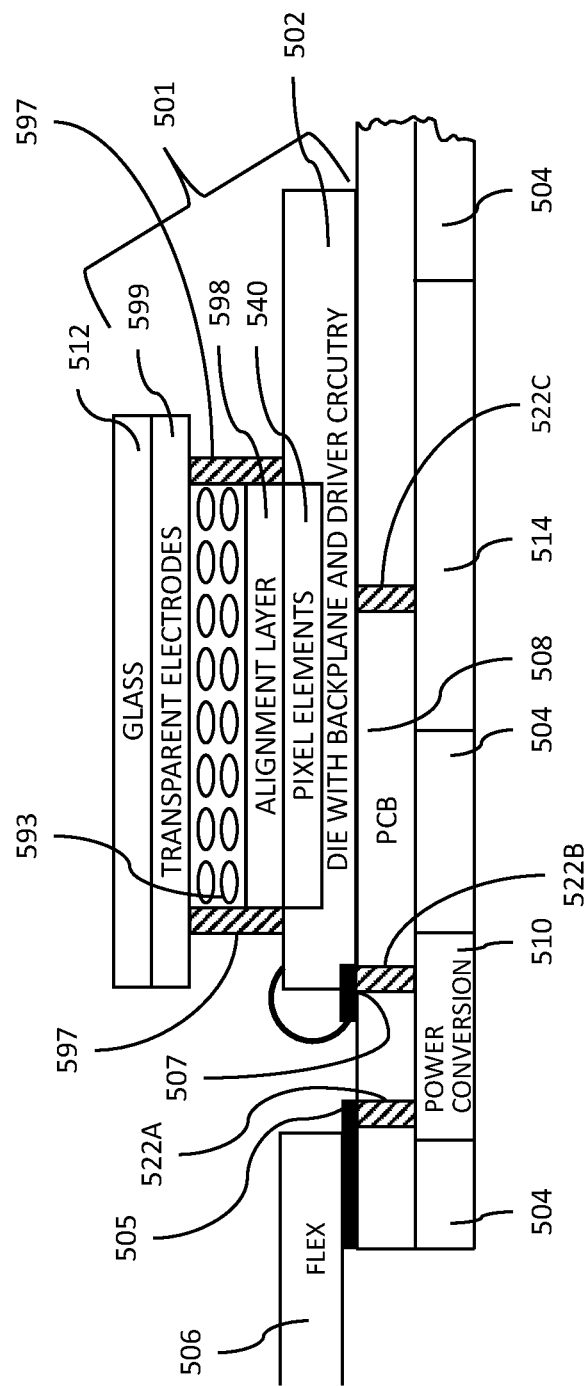
FIG. 5C is a cross section of a portion of the IDM of FIGS. 5A and 5B according to the present invention.

Referring now to FIGS. 5A, 5B, and 5C (collectively FIG. 5) another example of an IDM 500 is described including a cross-sectional/side of the IDM 500. Like-numbered components in FIG. 5 correspond to like-numbered components in FIG. 3 and FIG. 4 (e.g., element 504 in FIG. 5 corresponds to element 304 in FIG. 3); the functions, operation, and structure of like-numbered components are the same or similar and will not be repeated again here.

In this example, the FPC 506 couples to a PCB 508, but the coupling occurs at the end portion of the 530 of the FPC 506 and the end portion of the 532 of the PCB 508. In other words, the FPC 506 does not extend under the single integrated circuit 502. The PCB 508 is a single printed circuit board and the single integrated circuit (that includes the LCA) is coupled directly to the PCB 508 and not to the FPC 506. In an embodiment, the attachment of the PCB 508 and the FPC 506 may be made by an anisotropic conductive film 523. Alternatively, other attachment approaches can be used.

In aspects, the IDMS of FIGS. 3, 4, and 5 described herein are a display system or device IDM. The exemplary embodiments herein provide a number of benefits and advantages over conventional systems and methods. For example, the examples provide a very small unit that is more easily fit and integrated into a head-mounted augmented-reality system and requires minimal external circuitry. As a result, there is reduced cost, dimensions and weight of devices, which is beneficial for various mobile applications. The IDMs in accordance with the invention described herein eliminate the need for an external driver IC. (i.e., a driver IC external to the IDM). For instance, some previous approaches relied on external power conversion circuitry (external to the IDM) and this resulted in long transmission paths for the power resulting in undesired inductance and power loss. The PMIC provides for local power conditioning and power integrity for the components of the IDM, such that, for example, undesired inductance from long transmission lines and power loss from long or extended transmission lines is reduced Further, by making connections between circuitry on both sides of the IDM, power and signal delivery is enhanced and routing congestion is reduced. The inclusion of multiple ICs and passives into the IDM removes the burden of designing the interconnection between them and components of the IDM, and ensures correct and uniform interoperation of those components, thus making the IDM easier to include into other devices such as smart glasses or headsets.

Figure 6:
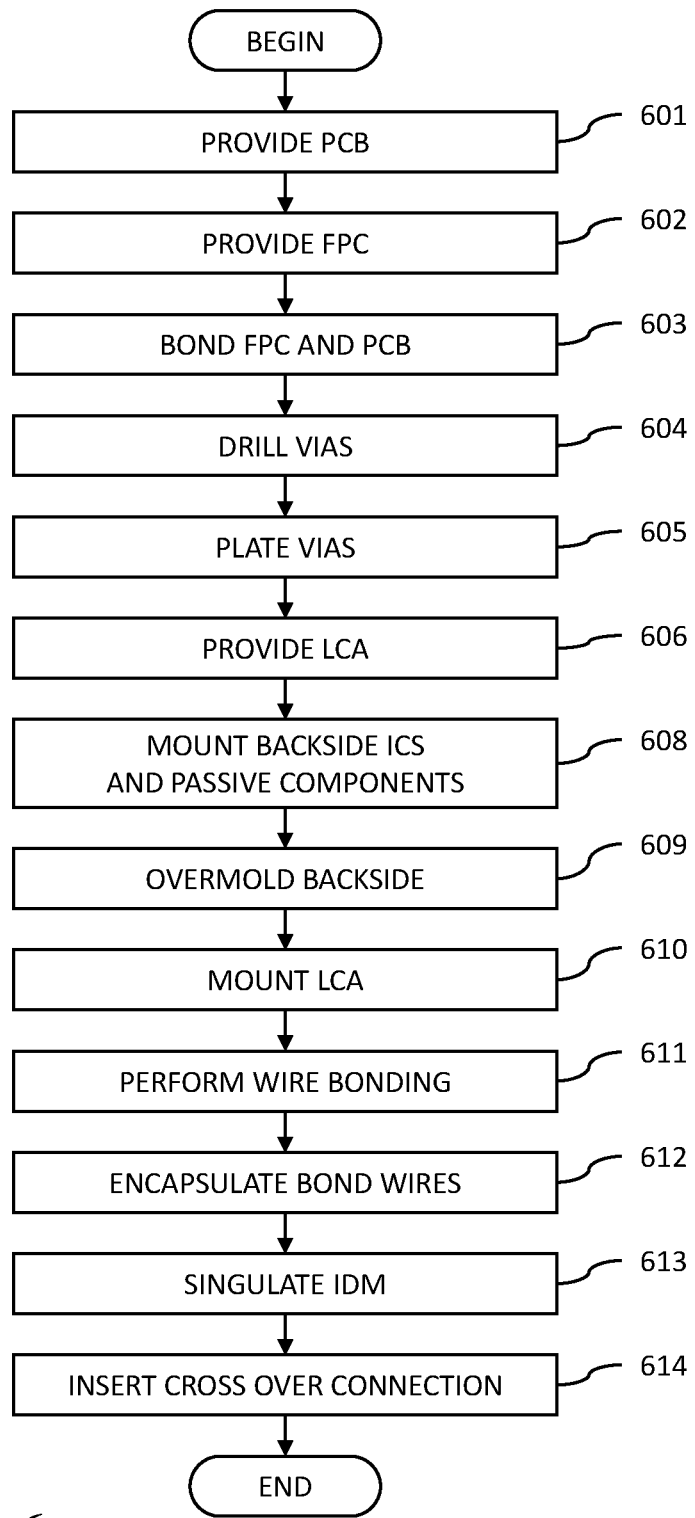
FIG. 6 is a flowchart of an approach of manufacturing an IDM according to embodiment of the present invention.

Referring now to FIG. 6, a method for manufacturing an IDM 300, 400, and 500 is provided. A list of the manufacturing steps that may be included in examples of the method of manufacture is described with respect to FIG. 6. It will be understood that the order of one or more of the following steps may be interchanged. In addition, one or more of these steps may be excluded.

In step 601, a PCB 308, 408, 508 is manufactured or provided in a multi-instance panel format for rigid portion using standard manufacturing methods. Multi-panel format means multiple PCB boards are formed in a single structure and then separated into individual boards The PCB 308, 408, 508 may be a single board or multiple board (308 and 309, 408 and 409, 508 and 509) as described herein.

In step 602, an FPC 306, 406, and 506 is manufactured or provided. The FPC can be provided in a multi-instance panel format with individual FPCs being separated from a single structure.

In step 603, the FPC 306, 406, and 506 is coupled to or bonded to PCB sections. In aspects, the bonding step occurs using mechanical means such as adhesive and pressure. It will be appreciated that as described herein the PCB may be single and multiple boards. In some examples, the PCB 308, 408, 508 and FPC 306, 406, and 506 are coupled in parallel relation to each other. In other examples, the PCB 308, 408, 508 and FPC 306, 406, and 506 may be coupled in an end-to-end fashion. Other examples and arrangements for attaching the PCB and FPC 306, 406, and 506 are possible.

In step 604, vias 322, 422, 522 are drilled or punched through the PCB 308, 408, 508 and FPC 306, 406, and 506 for vertical electrical connections between components. Appropriate drilling equipment or tools is used for this purpose.

In step 605, the vias 322, 422, 522 are plated or filled.

In step 606, the LCA 301, 401, 501 is provided. In an embodiment of the present invention, step 606 occurs using the following sub steps: 1) Form the silicon die 302, 402, 502 including all digital display circuitry 214, backplane circuitry 205, pixel elements 340, 440, 540, alignment layer 398, 498, 598 2) Apply perimeter seal material by dispending on to a roller and tolling onto wafer; 3) Apply cover glass 312, 412, 512 coated with transparent conductive material 399, 499, 599 facing towards the silicon die; 4) Singulate the LCAs from the wafer with cover glass by standard sawing methods and 5) The space enclosed by the glass, the silicon and the perimeter seal 397, 497, 597b is filled with Liquid Crystal 393, 493, 593 and the remaining opening in the perimeter seal 397, 497, 597b is filled with a drop of adhesive to fully contain the Liquid Crystal 393, 493, 593

In step 608, backside ICs and passive components 310 are mounted on a panel of FPC 306, 406, 506 and PCB via standard solder and/or reflow methods.

In step 609, the backside of the panel 362 is overmolded to encapsulate one or more of the components on the back side 362. The overmolding material 304, 404, 504 may be an epoxy and form a flat surface that facilitates attachment to other components or devices. The overmolding also protects the overmolded components.

In step 610, the singulated LCAs 301, 401, 501 are mounted to the front side 361 of the panel using appropriate die attach material (e.g., epoxy or other material).

In step 611, bonds 316, 416, 516 are wired from pads on the LCA die 301, 401, 501 to bond fingers on the FPC 306, 406, 505 or PCB section 308, 408, 508 and e the wire bonds with are encapsulated with encapsulant to provide mechanical protection at step 612. In step 613, the IDMs 300, 400, 500 are singulated from the panel using standard cutting or sawing methods. In step 614, cross-over connections 311, 411, 511b are inserted using conductive epoxy, or a combination of conductive epoxy and PCB material or Kovar plated with metal.

Figure 7:
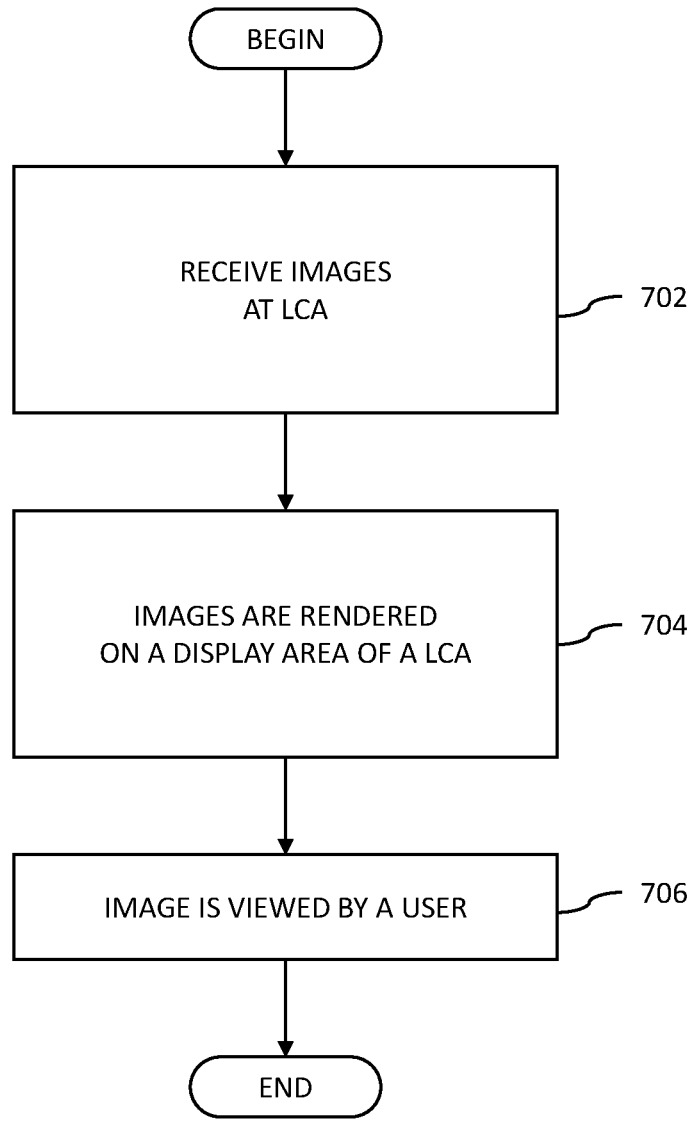
FIG. 7 is a flowchart illustrating operation of an IDM according to embodiment of the present invention.

Referring now to FIG. 7, one example an approach for displaying images on a display area in a virtual or augmented reality system is described.

At step 702 and at LCA 301, 401, 501, data and commands (e.g., images, video or commands) transmitted over data and control connections are received At step 704, the LCA 301, 401, 502 renders the images in a display area 363, 463, 563. The LCA 301, 401, 501 is disposed on a first side 361 of the structure 300, 400, 500.

A second side 362, 462, 562 of the structure 300, 400, 500 is arranged and formed in generally parallel relation to the first side 361, 161, 561. The second side 362, 462, 562 is at least partially overmolded with a material to provide a generally flat suffice. The generally flat surface facilitates attachment of the apparatus to other components or devices.

Figure 8:
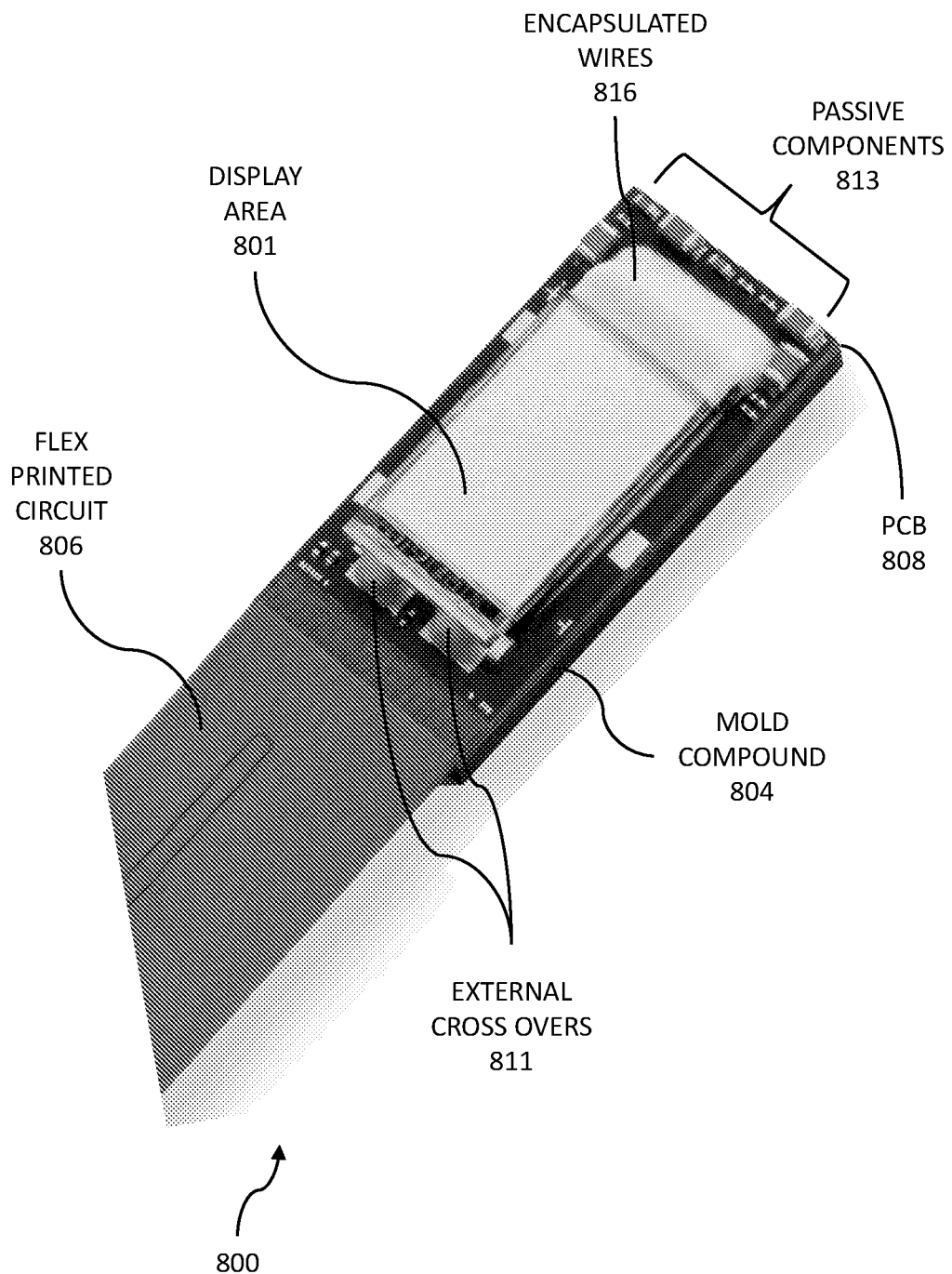
FIG. 8 is a three-dimensional diagram of an IDM according to an embodiment of the invention.

At step 706, the image is viewed by a user. The user may view the image through an optical engine as described herein, Referring now to FIG. 8, a three-dimensional depiction of an IDM 800 and FPC 806 is shown. The IDM 800 is similar to the IDM 300 of FIG. 3 and includes a single PCB 808. A display area 801 of an LCA is shown on a first side of the IDM 800 and is configured to present images to users. Passive components 813 are on the first side (and other passive components on a second side with these passive components being hidden). A mold compound 804 is disposed on the second side of the IDM 800 and is the same or similar to other mold compounds 304, 404, 504 as described elsewhere herein. Additionally, External crossovers 811 and encapsulated wires 816 perform similar functions to the crossovers 311, 411, 511 and wires 316, 416, and 516 described elsewhere herein.

As described above, the software module may include logic that is executed by processor. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from computer-executable instructions stored on a non-transitory computer-readable medium such as memory or storage 25, including, for example, random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, other commercially available processors and/or or other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor mat enables parallel execution of multiple threads. In addition, those of ordinary skill in the related will appreciate that a processor may be configured in what is generally referred to as 32 or 64 bit architectures, or other architectural configurations now known or that may be developed in the future. A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques. System memory may include any of a variety of known or future memory storage devices that can be used to store the desired information and that can be accessed by a computer. Computer readable storage media may include non-transitory volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, and/or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk. USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications. Computers or processors may be part of a network. A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the interact, or could also include various intranet architectures. Those of ordinary skill in the related arts will also appreciate that some users in networked environments may prefer to employ what are generally referred to as "firewalls" (also sometimes referred to as Packet. Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. An integrated display module, comprising:
    a liquid crystal assembly including a first substrate and a second substrate, wherein a liquid crystal material is disposed between the first and second substrates, and wherein the second substrate includes or is coupled to an array of pixel elements, each pixel element including a pixel electrode;
    backplane circuitry including pixel circuitry, wherein the pixel circuitry is at least one of disposed or integrated into the second substrate, and wherein the pixel circuitry is electrically coupled to at least one of the pixel electrodes;
    display driver circuitry electrically coupled to the pixel circuitry, wherein the display driver circuitry is at least one of disposed or integrated into the second substrate; and
    a flex printed circuit coupled to a printed circuit board,
    the liquid crystal assembly, backplane circuitry, and display driver circuitry being coupled to the printed circuit board;
    the flex printed circuit including conductive traces coupled to the liquid crystal assembly, backplane circuitry, and display driver circuitry; and
    the conductive traces being configured to provide an electrical interface to a host device external to the integrated display module.

2. The integrated display module of claim 1, wherein the printed circuit board has a structure that is more rigid than a structure of the flex printed circuit.

3. The integrated display module of claim 1, where a first portion of the flex printed circuit overlies and is attached to the printed circuit board to form a rigid portion of the integrated display module, and a second portion of the flex printed circuit does not overlie the printed circuit board and forms a flex portion of the integrated display module that is less rigid than the rigid portion.

4. The integrated display module of claim 1, wherein the electrical interface comprises a power interface to receive electrical power from a host platform that is external to the integrated display module.

5. The integrated display module of claim 1, wherein the second substrate is a silicon substrate.

6. The integrated display module of claim 1, wherein the pixel circuitry comprises a pixel circuit that is coupled to each of the pixel electrodes.

7. The integrated display module of claim 1, wherein an end of each of the conductive traces is coupled to a first connector.

8. The integrated display module of claim 1, wherein the flex printed circuit electrically couples an external power source to power management circuitry on the printed circuit board.

9. The integrated display module of claim 8, wherein the flex printed circuit is fixedly coupled to the printed circuit board.

10. The integrated display module of claim 8, further comprising a molded portion, wherein the molded portion encapsulates the power management circuitry.

11. The integrated display module of claim 10, wherein the molded portion is made from an insulating material.

12. The integrated display module of claim 1, wherein the display driver circuitry drives operation of the pixel elements via the pixel circuitry.

13. The integrated display module of claim 1, wherein the second substrate is coupled to a first side of the printed circuit board, and wherein a molded portion is at least one of coupled to or formed on a second and opposite side of the printed circuit board.

14. The integrated display module of claim 1, wherein the printed circuit board includes a second connector that electrically couples to a first connector.

15. A system comprising:
    a host device; and
    an integrated display module coupled to the host device, the integrated display module comprising:
        a liquid crystal assembly including a first substrate and a second substrate, wherein a liquid crystal material is disposed between the first and second substrates, and wherein the second substrate includes or is coupled to an array of pixel elements, each pixel element including a pixel electrode;
        backplane circuitry including pixel circuitry, wherein the pixel circuitry is at least one of disposed or integrated into the second substrate, and wherein the pixel circuitry is electrically coupled to at least one of the pixel electrodes;
        display driver circuitry electrically coupled to the pixel circuitry, wherein the display driver circuitry is at least one of disposed or integrated into the second substrate; and
        a flex printed circuit coupled to a printed circuit board,
        the liquid crystal assembly, backplane circuitry, and display driver circuitry being coupled to the printed circuit board;
        the flex printed circuit including conductive traces coupled to the liquid crystal assembly, backplane circuitry, and display driver circuitry; and
        the conductive traces being configured to provide an electrical interface between the integrated display module and the host device.

16. The system of claim 15, further comprising a power source, wherein the flex printed circuit electrically couples the power source to power management circuitry on the printed circuit board.

17. The system of claim 16, wherein the flex printed circuit is fixedly coupled to the printed circuit board.

18. The system of claim 16, further comprising a molded portion, wherein the molded portion encapsulates the power management circuitry.

19. The system of claim 18, wherein the molded portion is made from an insulating material.

20. The system of claim 18, wherein:
- the second substrate is coupled to a first side of the printed circuit board; and
- the molded portion is at least one of coupled to or formed on a second and opposite side of the printed circuit board.

* * * * *